Patented Apr. 5, 1932

1,852,782

UNITED STATES PATENT OFFICE

ALPHONS O. JAEGER, OF CRAFTON, PENNSYLVANIA, ASSIGNOR, BY MESNE ASSIGNMENTS, TO THE SELDEN RESEARCH & ENGINEERING CORPORATION, OF PITTSBURGH, PENNSYLVANIA, A CORPORATION OF DELAWARE

PURIFICATION OF SUBLIMABLE ORGANIC MATERIALS

No Drawing.   Application filed February 4, 1929.   Serial No. 337,534.

This invention relates to the purification of sublimable organic compounds.

It has been customary in the past to purify sublimable organic materials by direct sublimation or by fractional sublimation. This process is used particularly in connection with such products as phthalic anyhdride, benzoic acid, anthraquinone, naphthalic anhydride, especially when produced by catalytic vapor phase oxidations and the like. When fractional sublimation is used as in the patent to Chester E. Andrews, No. 1,685,624 dated September 25, 1928, a fractional separation is obtained but the separation is frequently not complete. This is a very serious matter in products such as phthalic anhydride produced by the air oxidation of naphthalene, naphthalic anhydride, and the like, because some of the impurities present or formed during sublimation are colored and a small quantity of the impurity very seriously affects the appearance of the product. These colored impurities in the case of phthalic anhydride are probably condensation products of alphanaphthoquinone with phthalic anhydride or with itself, and impart a pink or greenish tinge to the sublimed product. The present invention permits a more thorough purification of sublimable materials by subjecting the vapors from the sublimer to contact at an elevated temperature with condensation catalysts and absorbent materials which transform the impurities into non-volatile substances and absorb them. In this manner a single sublimation will do the work required by two or three sublimations where no absorptive catalyst is used and a purer product can be obtained at a much lower cost.

The sublimation of phthalic anyhdride, benzoic acid, anthraquinone, naphthalic anhydride, and similar sublimable organic materials containing color-forming impurities takes place normally at temperatures above the melting point of the material but quite materially below its boiling point in order to be a true sublimation. The maintenance of the material in the molten state at elevated temperatures for considerable periods of time, which are necessitated by the sublimation process, results in condensing colored impurities which are condensible by heat, the reaction however requiring considerable time. Subliming from a molten mass, therefore, results in the colored impurities being condensed into a form in which they are readily adsorbable by the adsorption and condensation catalysts.

A number of condensation and absorbent catalysts may be used and the invention in its broadest aspects is not limited to any particular absorbent catalyst. In general solids which are rich in pores or capillaries are the most suitable and such compounds containing aluminum oxide or similar oxides which favor condensation are especially effective. Among the best absorbent catalysts are base exchange bodies, siliceous or non-siliceous, diluted or undiluted with materials rich in capillaries, such as kieselguhr, colloidal $SiO_2$, metal oxides and the like. These base exchange bodies, which may advantageously contain aluminum oxide in their molecule are usually of microporous, honey comb like structure, form very effective absorbents and catalysts for the present invention and preferably their derivatives which are obtained either by replacing exchangeable bases with others especially those which are not strong alkalies, by base exchange or bringing about reaction between the base exchange body and compounds containing anions which react therewith to form the so-called salt-like bodies, are very effective and can be used instead of the simple base exchange bodies. Products from base exchange bodies which have been acid leached to remove part or all of the exchangeable bases with or without removing some or all of the non-exchangeable basic constituents of the nucleus are also very effective.

Polysilicates or complex metal oxide compounds such as polyoxy hydroxy metal compounds which are prepared from components similar to those used in the preparation of artificial base exchange bodies under reaction conditions which are neutral or acid to litmus instead of under conditions which are neutral or alkaline to phenolphthalein, possess many of the valuable characteristics of the base exchange bodies and these non-base exchanging silicates or metal oxide complexes are well suited for use in the present process.

Compounds containing aluminum oxide such as bauxite or the highly porous complex aluminum oxide known in the trade as "alumina gel" are also very effective, particularly in the purification of phthalic anhydride as they appear to absorb or condense naphthaquinonoid impurities some of which are red dyestuffs. Other porous materials such as earthenware granules, silica gel, activated carbon, etc. may be effectively used alone or with absorbent referred to above. Zinc carbonate ores, pyrolusite, siderite, and the like are also useful.

Porous bodies may also be coated or impregnated with solution of salts or oxides which are catalytically effective in the condensation of impurities.

The temperature at which the sublimer vapors are permitted to pass over the catalytic absorbent should be maintained high enough to avoid deposition of the sublimable material; usually this temperature will be from 50° C. or more above the point at which the sublimable material begins to separate out. It is also desirable in many cases to use very much higher temperatures, for example, temperatures on the order of those at which the usual catalytic oxidations take place as, for example, about 400° C. The temperatures used should not, of course, be so high that the sublimed material is no longer stable. While the invention is not limited to the use of any particular temperature, it should be understood that for the purification of specific sublimable material with particular catalytic absorbents, the best temperature will vary somewhat.

The catalytic absorbent, of course, gradually becomes charged with the relatively non-volatile impurities which have been ebsorbed and must, therefore, be periodically regenerated. In use it is of course normally preferable to have two parallel towers filled with the catalytic absorbent so that one tower can be used while the absorbent in the other tower is being regenerated. The regeneration may be by burning out the impurities by calcining processes at elevated temperatures where the catalytic absorbent is not damaged by such temperatures or where any change in the character of the absorbent does no harm as in the case of some zinc carbonate ores which on regeneration lose their carbon dioxide but are otherwise not adversely affected. Where the impurities are volatile with superheated steam as is the case of phthalic anhydride, the impurities may be so distilled out. This has the advantage that a part at least of the impurities are transformed into red dyestuff which when recovered has commercial value.

Instead of using a parallel arrangement of absorbent towers, of course a single tower can be used with provision for adding fresh absorbent at the top and removing spent absorbent from the bottom. Such a continuous process is very efficient.

The sublimation has been described above with air as the subliming gas and where the temperatures are not too high and the sublimed material is not readily oxidized air is a very suitable subliming medium. The invention however is not limited to the use of air and other carrier gases may be used such as mixtures of nitrogen and oxygen containing a lower percentage of oxygen than air, nitrogen, carbon dioxide, etc. It is frequently desirable especially where a subliming gas other than air is used to recirculate part or all of the subiming gas after the sublimed material has condensed out. This procedure reduces wastes of the carrier gas and conserves part of the heat.

The invention will be described particularly in connection with the purification of phthalic anhydride which is illustrative only and does not in any sense limit the invention.

Phthalic anhydride obtained by the catalytic oxidation of naphthalene with air in the vapor phase is sublimed from a molten state into an air stream and passed at about 200° C. over bauxite in a tower. The temperature of the gases is then reduced and phthalic anhydride precipitated out in the usual manner and preferably in condensers provided with various heat zones to effect a fractional separation. The bauxite condenses and absorbs the impurities and turns bright pinkish red. The phthalic anhydride obtained in the first and hottest condensers is perfectly white and is more than 99% pure. The bauxite is regenerated at intervals as described above.

Instead of using bauxite, "alumina gel" is substituted. This is a somewhat more effective condensing and absorbent agent than bauxite but has the disadvantage that it absorbs a certain amount of phthalic anhydride even at the high temperature. Preferably the spent "alumina gel" is subjected to treatment which enables the recovery of phthalic anhydride, with or without the recovery of the red dye absorbed.

Instead of using "alumina gel" other metal oxide gels may be used such as those prepared by the reaction of salts and metallates of the amphoteric metals under reaction conditions which are neutral or acid to litmus. The gels may contain oxy- or hydroxy-compounds of a single metal or of a plurality of metals.

Phthalic anhydride is sublimed as described above but instead of using bauxite or "alumina gel" a zeolite is used which is prepared by bringing about the reaction of potassium aluminate and potassium waterglass in the usual manner under conditions which result in the production of a zeolite. The zeolite is then subject to base exchange with an iron salt. If desired the zeolite may be diluted before or just after formation by incorporating a finely divided diluent such as kieselguhr, "celite" brick refuse, and the like. The incorporation may take place by adding the diluent to one or other of the reacting components or by kneading the zeolite gel with the diluent after formation but before it has set. The high capillarity of the zeolite renders it peculiarly operative as an absorbent.

Naphthalic anhydride or benzoic acid can be sublimed from a molten state under the conditions described above in connection with phthalic anhydride and an excellent product of high purity is obtained. Anthraquinone can also be subjected to the treatment described above but the temperatures at which the mixture is passed over the catalytic absorbent should be higher, 300–320° C. being a very suitable temperature range to use.

What is claimed as new is:

1. A method of purifying sublimable organic material containing impurities which are condensible by heat into adsorbable compounds, which comprises melting the material, vaporizing it from the molten state at a temperature below the boiling point of the material and subjecting the vapors to contact with a catalytic adsorbent, lowering the temperature of the vapors and condensing out the sublimate.

2. A process according to claim 1, in which the catalytic absorbent contains a compound of an amphoteric metal included in the group consisting of oxides, hydroxides, hydrated oxides.

3. A method according to claim 1, in which the catalytic absorbent contains a compound of aluminum included within the group consisting of oxides of aluminum, hydroxides of aluminum, hydrated oxides of aluminum.

4. A method according to claim 1, in which the catalytic absorbent is periodically regenerated by a process which recovers at least part of the absorbed impurities.

5. A method according to claim 1, in which the catalytic adsorbent is an aluminum oxide gel.

6. A method of purifying sublimable organic material containing impurities which are condensible by heat into adsorbable compounds, which comprises melting the material, vaporizing it from the molten state at a temperature below the boiling point of the material and subjecting the vapors to contact with a catalytic adsorbent, of high porosity or surface energy.

7. A method of purifying sublimable oxidation products of aromatic compounds containing impurities which are condensible by heat into adsorbable compounds which comprises melting the material, vaporizing it from the molten state at a temperature below the boiling point of the material and subjecting the vapors to contact with a catalytic absorbent, lowering the temperature of the vapors and condensing out the sublimate.

8. A method of purifying phthalic anhydride containing impurities which are condensible by heat into adsorbable compounds, which comprises melting the material, vaporizing it from the molten state at a temperature below the boiling point of the material and subjecting the vapors to contact with a catalytic absorbent lowering the temperature of the vapors and condensing out the sublimate.

9. A method according to claim 8, in which the vapors of phthalic anhydride are contacted with the catalytic absorbent at a temperature at least 50° C. above that at which phthalic anhydride condenses out.

10. A method according to claim 8, in which the phthalic anhydride vapors are contacted with the catalytic absorbent at about 200° C.

11. A method according to claim 8, in which the catalytic adsorbent is an aluminum oxide gel.

12. A method of purifying sublimable organic material containing impurities which are condensible by heat into adsorbable compounds, which comprises melting the material, vaporizing it from the molten state at a temperature below the boiling point of the material into a carrier gas stream which is substantially inert to phthalic anhydride at the temperature used, subjecting the gaseous stream to contact with a catalytic absorbent, reducing the temperature of the gas stream sufficiently to condense out at least part of the sublimable material and recirculating at least part of the carrier gas stream.

13. A method according to claim 12, in which a carrier gas stream having an oxidizing effect less than air is used.

Signed at Pittsburgh, Pennsylvania this 1st day of February, 1929.

ALPHONS O. JAEGER.